United States Patent

Shinohara et al.

Patent Number: 5,409,996
Date of Patent: Apr. 25, 1995

[54] THERMOPLASTIC RESIN COMPOSITION

[75] Inventors: Hironobu Shinohara, Machida; Yoshinobu Suzuki, Suzuka; Kazuhiko Yamamoto, Kuwana, all of Japan

[73] Assignee: Japan Synthetic Rubber Co., Ltd., Tokyo, Japan

[21] Appl. No.: 200,423

[22] Filed: Feb. 23, 1994

[30] Foreign Application Priority Data

Feb. 23, 1993 [JP] Japan ............... 5-057968

[51] Int. Cl.⁶ ............... C08L 53/00; C08L 23/08; C08L 81/02
[52] U.S. Cl. .................. 525/189; 525/537
[58] Field of Search ................ 525/189

[56] References Cited

U.S. PATENT DOCUMENTS

| | | |
|---|---|---|
| 5,164,469 | 11/1992 | Goto et al. |
| 5,218,048 | 6/1993 | Abe et al. ............... 525/189 |
| 5,292,789 | 3/1994 | Ishida et al. ............... 525/179 |

FOREIGN PATENT DOCUMENTS 2178340 7/1990 Japan ............... 525/189

OTHER PUBLICATIONS

Patent Abstract of JP 2075662; Mar. 15, 1990 Resin Compsns. For Sealing Electronic Parts–Contain Poly (Phenylene Sulfide) Resin, Fibrous Reinforcer Other Inorganic Filler, Organic Silane And Bis (Fatty Acid Amide), etc.

*Primary Examiner*—Melvyn I. Marquis
*Assistant Examiner*—Helen F. Lee
*Attorney, Agent, or Firm*—Oblon, Spivak, McClelland, Maier & Neustadt

[57] ABSTRACT

A thermoplastic resin composition comprising (a) 50–99% by weight of a polyarylenesulfide resin and (b) 50–1% by weight of a norbornene-type resin as essential components is disclosed. This resin composition possesses excellent stiffness properties and high heat resistance, and exhibits only small anisotropic properties and superior moldability during the molding operation, and is useful for molding various electronic parts, household electric or electronic parts and articles. Those having a Vicut softening point of 200° C. or higher are especially useful for sealing electronic parts or photo-semiconductors.

8 Claims, No Drawings

THERMOPLASTIC RESIN COMPOSITION

BACKGROUND OF THE INVENTION

1. Field of the Invention

The present invention relates to a thermoplastic resin composition which possesses excellent stiffness properties and high heat resistance, and exhibits only small anisotropic properties during the molding operation, and superior moldability. The present invention also relates to a molded article made of the thermoplastic resin composition and to sealing method of electronic parts or photo-semiconductors using this thermoplastic resin composition.

2. Description of the Background Art

Because polyarylenesulfide resin is a thermoplastic resin which is excellent in the heat resistance, chemical resistance, electric properties, mechanical properties, dimensional resistance, and the like, it is used as a material for manufacturing precision parts and as a sealing material for electric or electronic parts.

This resin is, however, a highly crystalline polymer and exhibits conspicuously high fluidity in the temperature range above the melting point. Controlling the high fluidity during injection molding operations is difficult, resulting in production of flashes in the products and also in the significant reduction in the yield of precision parts products.

Furthermore, the high crystalline properties of the polyarylenesulfide resin can be the cause of extreme anisotropy in the characteristics of the molded products, such as molding contraction, tenacity, and the coefficient of linear expansion, along the direction of the resin flow and in the direction vertical to the flow of the resin. These are the causes of poor dimensional precision of the resin.

In order to obtain molded products with a designed dimension from this type of resin, it is essential to design molds and establish molding conditions taking the anisotropic properties of the resin into consideration. This requires special techniques, involving costs which otherwise need not be expensed.

In order to overcome this problem and to provide a resin with improved moldability, a resin composition comprising a polyarylenesulfide resin and a polystyrene resin has been proposed (Japanese Patent Publication (kokoku) No. 13469/1978). This resin composition has an extremely low heat deformation temperature and produces molded articles with impaired heat resistance. For instance, when directed to applications requiring soldering, such molded articles may be deformed by the heat of the soldering operation.

On the other hand, when a polyarylenesulfide resin composition is used as a sealing material, it exhibits only insufficient adhesion to lead frames due to the crystalline properties of the resin and depending on the other components which make up the composition. Water may invade into the interface between the sealing resin composition and the lead frame, giving rise to lowered electrical insulation and to corrosion of electrodes.

The polyarylenesulfide resin inherently exhibits low adhesion properties to metals and various organic or inorganic materials due to the characteristics of the chemical structure of this resin. For example, when an article molded from this resin is used after having been adhered to various other materials, the adhered parts may easily be released depending on the environmental conditions of use. In some cases, the article cannot be practically used. When the molded resin is used for holding parts made of other material, it exhibits only insufficient holding capability. Further, it is difficult to print the molded article or to provide ornament.

An object of the present invention is therefore to provide a thermoplastic resin composition which is free from all these drawbacks in the polyarylenesulfide resin, that is, a resin composition which possesses excellent moldability, decreased anisotropic properties, and improved adhesion to lead frames and other materials.

When the thermoplastic resin composition is used as a sealing material, it is essential that the resin have heat resistance sufficient to resist the heat at soldering temperatures. The present inventors have found that such a thermoplastic resin composition must have a Vicut softening point of 200° C. or higher.

Owing to the carbon-carbon cyclic structure the norbornene-type resin used in the present invention has characteristics of high heat resistance and low moisture absorption. Because of this, the high heat resistance and low moisture absorption properties which are also characteristic to the polyarylenesulfide resin are not unduly impaired by blending a norbornene-type resin. Furthermore, because the norbornene-type resin is non-crystalline due to its bulky structure, the fluidity in the temperature range above the melting point of the crystalline polyarylenesulfide resin can be controlled by blending it with the norbornene-type resin. This can greatly improve the moldability of the polyarylenesulfide resin.

Moreover, the non-crystalline characteristic of the norbornene-type resin can greatly reduce the anisotropic properties in the molding of the polyarylenesulfide resin composition. Blending a norbornene-type resin with the polyarylenesulfide resin can also improve its adhesion properties to lead frames and various other materials.

SUMMARY OF THE INVENTION

Accordingly, an object of the present invention is to provide a thermoplastic resin composition comprising (a) 50–99% by weight of a polyarylenesulfide resin and (b) 50–1% by weight of a norbornene-type resin, as essential components.

In a preferred embodiment of the present invention, said thermoplastic resin composition has a Vicut softening point of 200° C. or higher.

Another object of the present invention is to provide a molded article from a thermoplastic resin composition comprising (a) 50–99% by weight of a polyarylenesulfide resin and (b) 50–1% by weight of a norbornene-type resin, as essential components.

In a preferred embodiment, said molded article is prepared from said thermoplastic resin composition having a ratio of the molding contraction rate along the direction of resin flow ($\epsilon_p$) and the molding contraction rate in the direction vertical to the resin flow ($\epsilon_v$), ($\epsilon_v/\epsilon_p$)=0.5–2.0, as measured under the following conditions, (1) Shape of the molded article: a plate with a dimension of $5'' \times \frac{1}{2}'' \times 1/32''$, (2) Mold temperature: 150° C., and (3) Cylinder temperature: 315° C.

In another preferred embodiment, said molded article is prepared from said thermoplastic resin composition which produces flashes of the area of 2.0 cm$^2$ or smaller, as measured under the following conditions, (1) Shape of the molded article: a plate with a dimension of 5"×½"×1/32",
(2) Mold temperature: 150° C., and
(3) Cylinder temperature: 315° C.

A further object of the present invention is to provide a method of sealing electronic parts and photo-semiconductors using said thermoplastic resin composition.

Other objects, features and advantages of the invention will hereinafter become more readily apparent from the following description.

DETAILED DESCRIPTION OF THE INVENTION AND PREFERRED EMBODIMENTS

Each component of the thermoplastic resin composition of the present invention will be hereinafter illustrated in detail.

Component (A)

Polyarylenesulfide is a polymer having a major construction unit represented by the formula, —Ar—S—, wherein Ar is a divalent aromatic group. Given as typical examples of the divalent aromatic groups are p-phenylene group, m-phenylene group, 2,6-naphthalene group, 4,4'-biphenylene group, p-p'-bibenzyl group, and nuclear-substituted groups of these. Among these, poly-p-phenylenesulfide with no nuclear-substituted groups is preferred in view of the superior moldability.

It is essential that the polyarylenesulfide used in the present invention contain at least 70 mol % or more of the above construction unit in a molecule. The proportion of this construction unit smaller than 70 mol % may bring about undesirable results in properties of the polyarylenesulfide, such as low crystalline properties, a low glass transition temperature, and impaired characteristics in the molded articles.

The polyarylenesulfide used in the present invention may contain tri- or more-valent aromatic groups (such as 1,2,4-bonding-phenylene group), aliphatic groups, hetero atom-containing groups, or the like, up to 30 mol % in a molecule.

It is possible to use either linear-type or cross-linked-type polyarylenesulfides, independently or together, depending on the purposes. For instance, when flashes in the molded articles produced in the injection molding are desired to be reduced, the use of cross-linked polyarylenesulfide is recommended. In order to decrease anisotropy in the molding contraction (defined as the differences in the contraction along the direction of the flow of the material and the contraction in the direction vertical to the material flow, wherein the contraction is defined as the ratio of the size of the molded article to the size of the mold), the use of linear polyarylenesulfide is recommended.

Furthermore, either a modified polyarylenesulfide or a mixture of a polyarylenesulfide and a modified polyarylenesulfide may be used as the polyarylenesulfide in the present invention. As modified polyarylenesulfides, those modified by functional groups, such as epoxy group, amino group, carboxy group, acid anhydride group, oxazoline group, vinyl group, (meth)acryl group, or mercapto group, can be used, with epoxy-modified polyarylenesulfide and amino-group-modified polyarylenesulfide being particularly preferred.

The reactions of these functional groups with the ester group in the norbornene-type resin produce a block copolymer of polyarylenesulfide and the norbornene-type resin, which contributes to the promotion of mutual solubility of the two resins, to the improvement in the characteristics and moldability of the resulting resin composition, and also to the reduction in the anisotropy in the characteristics and moldability, which is the drawback of the polyarylenesulfide.

Component (B)

The norbornene-type resins used in the present invention are those having a major chain consisting of a saturated aliphatic hydrocarbon group which contains a norbornane structure. Specific examples are those having norbornane recurring units, and include thermoplastic resin compositions containing norbornane structures represented by the following formulas (I) to (IV),

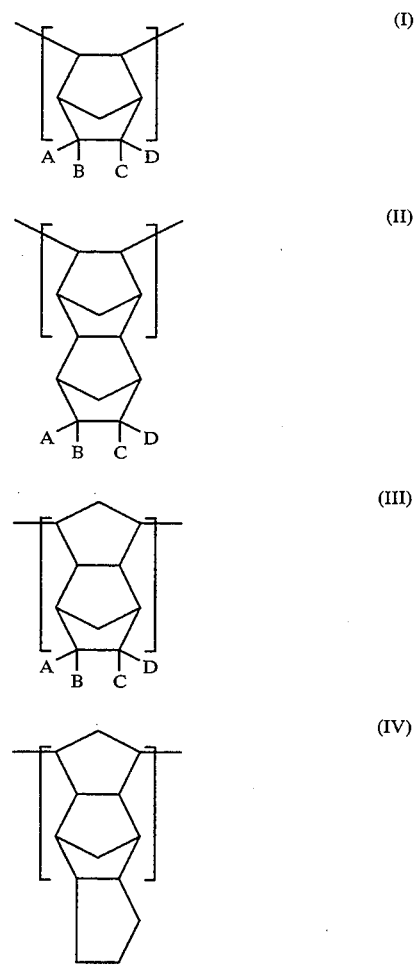

wherein A, B, C, and D individually represents a hydrogen atom, a hydrocarbon group having 1–10 carbon atoms, a halogen atom, a hydrocarbon group having 1–10 carbon atoms which are substituted by a halogen atom, groups of the formulas —(CH$_2$)$_n$COOR$^1$, —(CH$_2$)$_n$OCOR$^1$, —(CH$_2$)$_n$OR$^1$, —(CH$_2$)$_n$CN, —(CH$_2$)$_n$CONR$^3$R$^2$, —(CH$_2$)$_n$COOZ, —(CH$_2$)$_n$OCOZ, —(CH$_2$)$_n$COZ, or —(CH$_2$)$_n$W, or B and C may together form an cyclic alkylene group of the formula,

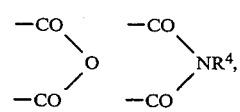

wherein $R^1$, $R^2$, $R^3$, and $R^4$ individually represent a hydrocarbon group having 1–20 carbon atoms, Z is a hydrocarbon group substituted by a halogen atom, W is a group $SiR^5_pF_{3-p}$ (wherein $R^5$ is a hydrocarbon group having 1–10 carbon atoms and F denotes a halogen atom, —OCOR$^6$, or OR$^6$ (wherein $R^6$ is a hydrocarbon group having 1–10 carbon atoms), and p is an integer of 0–3), and n is an integer of 1–10.

Resins obtained by the hydrogenation of a ring-opened polymer from norbornene-type monomers and resins obtained by the addition polymerization of norbornene-type monomers can be given as specific examples of norbornene-type resins used in the present invention. Two or more norbornene-type monomers may be used for obtaining norbornene-type polymers. The hydrogenation and polymerization can be carried out by a conventional method without special restrictions.

Given as specific examples of norbornene-type monomers are norbornene; norbornenes substituted by alkyl and/or alkylidene groups, such as 5-methyl-2-norbornene, 5-dimethyl-2-norbornene, 5-ethyl-2-norbornene, 5-butyl-2-norbornene, and 5-ethylidene-2-norbornene; norbornenes further substituted by a polarized groups such as halogen atom; dicyclopentadiene, 2,3-dihydrodicyclopentadiene, and the like; dimethanoctahydronaphthalene, dimethanoctahydronaphthalene substituted by alkyl and/or alkylidene groups, and further substituted by a polarized groups such as halogen atom, carboxyl group, or cyano group, for example, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethanol,4,4a,5,6,7,8,8a-octahydronaphthalene, and 6-methoxycarbonyl-1,4:5,8-dimethano-1,4,4a,5,6,7,8-,8a-octahydronaphthalene;

Addition products of cyclopentadiene and tetrahydroindene or the like; trimer or tetramer of dicyclopentadiene, such as 4,9:5,8-dimethano-3a,4,4a,5,8,8a,9,9a-octahydro-1H-benzoindene, 4,11:5,10:6,9-trimethano-3a,4,4a,5,5a,6,9,9a,10,10a,11,11a-dodecahydro-1H-cyclopentaanthracene, 5-carboxymethylbicyclo[2.2.1]hept-2-ene,
5-methyl-5-carboxymethylbicyclo[2.2.1]hept-2-ene,
5-cyanobicyclo-[2.2.1]hept-2-ene,
8-carboxymethyltetracyclo[4.4.0. $1^{2.5}.1^{7.10}$]-3-dodecene,
8-carboxyethyltetracyclo[4.4.0. $1^{2.5}.1^{7.10}$]-3-dodecene,
8-carboxy-n-propyltetracyclo-[4.4.0.$1^{2.5}.1^{7.10}$]-3-dodecene,
8-carboxy-i-propyltetracyclo[4.4.0.$1^{2.5}.1^{7.10}$]-3-dodecene,
8-carboxy-n-butyltetracyclo[4.4.0.$1^{2.5}.1^{7.10}$]-3-dodecene,
8-methyl-8-carboxymethyltetracyclo[4.4.0.$1^{2.5}.1^{7.10}$]-3-dodecene,
8-methyl-8-carboxyethyltetracyclo[4.4.0.$1^{2.5}.1^{7.10}$]-3-dodecene,
8-methyl-8-carboxy-n-propyltetracyclo-[4.4.0.$1^{2.5}.1^{7.10}$]-3-dodecene,
8-methyl-8-carboxy-i-propyltetracyclo-[4.4.0.$1^{2.5}.1^{7.10}$]-3-dodecene, and
8-methyl-8-carboxy-n-butyltetracyclo[4.4.0.$1^{2.5}.1^{7.10}$]-3-dodecene.

When norbornene monomers are polymerized by ring-opening reaction by a known method, other cycloolefins which can be polymerized by the ring-opening reaction may be used together to the extent that the effects of the present invention are not substantially affected. Compounds having one reactive double bond, such as cyclopenetene, cyclooctene, and 5,6-dihydrodicyclopentadiene, can be given as specific examples of such other cycloolefins.

Resins described in Japanese Patent Laid-open (kokai) Nos. 168708/1985, 252406/1987, 252407/1987, 133413/1990, 145324/1988, 264626/1988, and 240517,1989, and Japanese Patent Publication No. 8815/1982 can be given as examples of norbornene-type resins having a norbornene structure which can be used in the present invention. Especially preferred among these norbornene-type resins are hydrogenated polymers obtained by the hydrogenation of polymers which are obtained by the ring-opening polymerization of at least one tetracyclododecene derivative represented by the formula (V) and an unsaturated cyclic compound which is copolymerizable with this tetracyclododecene derivative, using a metathesis catalyst such as W, Mo, and Re.

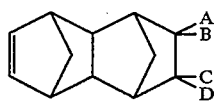

(V)

wherein A, B, C, and D are the same as defined above.

The tetracyclododecene derivative of formula (V) is preferably contain a polarized group as A, B, C, or D in view of better adhesion properties of the thermoplastic resin composition to various materials. It is particularly preferable that this polarized group be a group represented by —(CH$_2$)$_n$COOR$^1$, wherein $R^1$ and n are the same as previously defined.

Furthermore, in order for the hydrogenated polymer obtained to have low moisture absorption properties while maintaining high heat resistance, it is desirable that one molecule of the tetracyclododecene derivative of formula (V) contain one polarized group represented by —(CH$_2$)$_n$COOR$^1$. Moreover, among the carboxylate groups represented by —(CH$_2$)$_n$COOR$^1$, those having a smaller value for n is preferred in order for the hydrogenated polymer to have a high glass transition temperature.

Regarding the carbon atom number (1–20) possessed by the hydrocarbon group represented by $R^1$, a larger carbon number is preferred for obtaining the hydrogenated polymer with smaller moisture absorption properties. However, from the aspect of the balance between the moisture absorption properties and the glass transition temperature of the hydrogenated polymer, a linear alkyl group having 1–4 carbon atoms or a (poly)cyclic alkyl group having 5 or more carbon atoms, especially methyl, ethyl, and cyclohexyl groups, are preferred.

Furthermore, tetracyclododecene derivatives with a hydrocarbon group having 1–10 carbon atoms bonded to the carbon to which the group —(CH$_2$)$_n$COOR$^1$ is bonded, as a substitution group, are preferred, because such tetracyclododecene derivatives have low moisture absorption properties while maintaining a high glass transition temperature. In particular, the tetracyclododecene derivatives of formula (V) having methyl or ethyl group as this substitution group are preferred due to readiness of their synthesis.

These norbornene derivatives or the mixtures of a norbornene derivative and a copolymerizable unsaturated cyclic compound are subjected to the metathesis polymerization using a metathesis catalyst comprising a combination of (a) at least one compound selected from tungsten compounds, molybdenum compounds, rhenium compounds, and tantalum compounds, and (b) at least one compound selected from compounds containing at least one element-carbon bond or element-hydrogen bond, wherein the element is selected from the elements belonging to groups Ia, IIa, IIb, IIIa, IVa, or IVb in Deming's Periodic Table.

The tungsten compounds, molybdenum compounds, rhenium compounds, and tantalum compounds, which are component (a) of the metathesis catalyst, may be a halogen compound, an oxyhalogen compound, an alkoxyhalogen compound, an alkoxide, a carboxylate, an (oxy)acetylacetonate, a carbonyl complex, an acetonitrile complex, a hydride complex, derivative of these compounds, or a combination of these. Among these, tungsten compounds and molybdenum compounds, especially alkoxy compounds, halogen compounds, oxyhalogen compounds, or alkoxyhalogen compounds of tungsten or molybdenum, are preferred in view of their high polymerization activity and the availability. These compounds may be complexed with a suitable complexing agent, such as $P(C_6H_5)_3$ and $C_5H_5N$.

Specific examples of these compounds for the component (a) of the metathesis catalyst include, $WCl_6$, $WCl_5$, $WBr_6$, $WF_6$, $WI_6$, $MoCl_3$, $MoCl_4$, $MoCl_5$, $ReCl_3WOCl_4$, $ReOCl_3$, $ReOBr_3$, $W(OC_4H_3)$, $WCl_3(OC_4H_5)_4$, $Mo(OC_2H_5)_2Cl_3$, $Mo(OC_2H_5)_5$, $W(CO)_4$, $Mo(CO)_4$, $Re_2(CO)_{10}$, $ReOBr_2P(C_4H_5)_3$, $WCRl_5P(C_6H_5)_3$, $WCl_4C_5H_5N$, $W(CO)_5P(C_4H_5)_2$, and $W(CO)_5(CH_2CN)_2$.

The component (b) of the metathesis catalyst are compounds selected from organometallic compounds and hydrides containing an element belonging to one of the groups of Ia, IIa, IIb, IIIa, IVa, or IVb in Deming's Periodic Table. Specific examples of the compounds used as the component (b) of the metathesis catalyst include $n\text{-}C_4H_9Li$, $n\text{-}C_3H_{11}Na$, $C_3H_5Na$, $CH_2MgI$, $C_2H_3MgBr$, $CH_3MgBr$, $n\text{-}C_3H_7MgCl$, $t\text{-}C_4H_9MgCl$, $CH_2\text{=}CHCH_2MgCl$, $(C_2H_3)_2Zn$, $(C_2H_3)_2Cd$, $CaZn(C_2H_5)$, $(CH_2)_2B$, $(C_2H_5)_2B$, $(n\text{-}C_4H_9)_3B$, $(CH_2)_2Al$, $(CH_2)_2AlCl$, $(CH_2)_2Al_2Cl_3$, $(CH_2)_2AlCl_2$, $(C_2H_3)_3Al$, $LiAl(C_2H_5)_4$, $(C_2H_5)_3AlO(C_2H_5)_2$, $(C_2H_3)_2AlCl$, $C_2H_3AlCl_2$, $(C_2H_5)_2AlH$, $(i\text{-}C_2H_9)_2AlH$, $(C_2H_5)_2AlOC_2H_3$, $(i\text{-}C_4H_9)_3Al$, $(C_2H_5)_3Al_2Cl_3$, $(CH_3)_4Ga$, $(CH_3)_4SN$, $(n\text{-}C_4H_9)_4Sn$, $(C_2H_5)_3SiH$, $(s\text{-}C_6H_{12})_2Al$, $(n\text{-}C_8H_{17})_2Al$, $LiH$, $NaH$, $B_2H_4$, $NaBH_4$, $AlH_3$, $LiAlH_4$, $BiH_4$, and $TiH_4$. A mixture of two or more compounds which produce one of these compounds of component (b) by reaction may also be used.

Especially preferred compounds for the component (b) are $(CH_3)_2Al$, $(CH_2)_2AlCl$, $(CH_3)_{1.5}Al_{1.5}$, $CH_2AlCl_2$, $(C_2H_5)_2Al$, $(C_2H_5)_2AlCl$, $(C_2H_5)_{1.5}AlCl_{1.5}$, $C_2H_5AlCl$, $(C_2H_5)_2AlH$, $(C_2H_5)_2AlOC_2H_5$, $(C_2H_5)_2AlCN$, $(C_3H_7)_3Al$, $(i\text{-}C_4H_9)_2Al$, $(i\text{-}C_4H_9)_2AlH$, $(C_6H_{12})_3Al$, $(C_8H_{17})_3Al$, and $(C_6H_5)_2Al$.

The ratio of component (a) to component (b) used in the metathesis catalyst, in terms of metallic elements, is 1:1 to 1:40, and preferably 1:2 to 1:20.

Although the catalyst consisting of the two components (a) and (b) exhibits a high activity to the metathesis polymerization reactions, a catalyst with a higher activity can be obtained by further adding the component (c), as an activation agent.

Among various compounds usable as the component (c), the following compounds are particularly preferred.

(1) Non-metallic compounds, such as elemental boron and boron compounds ($BF_3$, $BCl_3$, $B(O\text{—}n\text{-}C_4H_9)_3$, $(C_2H_5O)_2BF$, $B_2O_3$, and $H_2BO_3$), and silicon compound such as $Si(OC_2H_5)_4$.

(2) Alcohols (3) Water (4) Oxygen (5) Carbonyl compounds, such as aldhydes, esters, and ketones, as well as polymers of carbonyl compounds.

(6) Cyclic ethers such as ethylene oxide, epichlorohydrine, and oxetane.

(7) Amides such as N,N-diethylformamide and N,N-dimethylacetamide; amines such as aniline, morpholine, and pyperidine; and azo compounds such as azobenezene.

(8) N-nitroso compounds such as N-nitrosodimethylamine and N-nitrosodiphenylamine.

(9) Compounds containing S—Cl or N—Cl, such as trichloromelamine, N-chlorosuccinimide, and phenylsulfenylchloride.

The proportion of the components (a) and (c) varies depending on the types of compounds added as component (c), and thus cannot be generically specified. In most cases, the mol ratio of component (c) to component (a) is is 0.005 to 10, and preferably 0.005 to 2.0.

Any polymerization solvents can be used without specific limitations, inasmuch as the solvent can dissolve the monomers (norbornene derivatives or mixtures of a norbornene derivative and a copolymerizable unsaturated cyclic compound) and the polymers produced therefrom, and does not interfere with the metathesis polymerization reaction. Examples of such solvents include: saturated hydrocarbon solvents, such as pentane, hexane, heptane, cyclopentane, cyclohexane, and decaline; aromatic solvents, such as benzene, toluene, xylene, and ethylbenzene; halogenated solvents, such as methylene chloride, chloroform, 1,2-dichloroethane, 1,1,2,2-tetrachloroethane, and chlorobenzene; ether-type solvents, such as diethyl ether, 1,2-dimethoxyethane, 1,2-diethoxyethane, diethylene glycol dimethyl ether, diethylene glycol diethyl ether, 1,4-butanediol diethyl ether, tetrahydrofuran, tetrahydropyrane, 1,4-dioxane, and anisole; and ester-type solvents, such as methyl acetate, ethyl acetate, propyl acetate, and butyl acetate. Mixtures of these solvents can also be used as the polymerization solvents. Preferred polymerization solvents among these are cyclohexane, benzene, toluene, xylene, 1,2-dimethoxyethane, butyl acetate, and mixtures of these solvents.

Polymers used in the present invention may be prepared to have a desired molecular weight by using an appropriate polymerization modifier. Ethylene, propene, 1-butene, 1-pentene, 1-hexene, and 1-heptene can be given as examples of suitable polymerization modifiers.

The polymers obtained in this manner is subjected to hydrogenation using a suitable hydrogenation catalyst to hydrogenate unsaturated carbon-carbon bonds. Conventional hydrogenation catalysts can be used for the hydrogenation of the norbornene-type resin polymer.

Solid catalysts comprising a novel metal, such as palladium, platinum, nickel, rhodium, or ruthenium, supported on a carrier, such as carbon, silica, alumina, titania, or silica-magnesia, can be given as examples of non-homogeneous-type catalysts. These catalyst may be in the form of either powder or particles, and the reaction may be carried out either in a fixed-bed or a suspension-bed.

Examples of homogeneous-type catalysts include nickel naphthenate/triethylaluminum, nickel acetylacetonate/triethylaluminum, cobalt octanoate/n-butyl lithium, titanocene dichloride/diethylaluminum monochloride, and rhodium catalysts such as rhodium acetate, chlorotris(triphenylphosphine)rhodium, and the like.

The hydrogenation reaction is carried out in a hydrogen atmosphere of the pressure from atmospheric pressure to 300 atm, preferably 3 to 200 atm, and a temperature of 0°–200° C, preferably 20°–180° C.

Among the solvents used in the polymerization reaction, those having no carbon-carbon unsaturated bonds can be used also for the hydrogenation reaction, provided that the use of halogen-containing solvents which may act as an inhibitor for the certain types of hydrogenation catalyst must be avoided.

Preferred solvents for the hydrogenation reaction are ether-type solvents, such as tetrahydrofuran and ethylene glycol dimethyl ether, and hydrocarbon solvents such as hexane, cyclohexane, and decaline, as well as mixed solvents of these.

These hydrogenated polymers used as the norbornene-type resin in the present invention preferably have inherent viscosity ($[\mu]_{inh}$), measured in chloroform at 30° C., in the range of 0.3 to 1.5 dl/g. The $[\mu]_{inh}$ within this range ensures superior moldability, heat resistance, moisture resistance, chemicals resistance, and mechanical resistance.

The hydrogenation rate of the hydrogenated polymers, measured by the $^1$H-NMR at 60 MHz, is 50% or more, preferably 90% or more, and most preferably 98% or more. Higher the hydrogenation rate, the more excellent the stability against heat and light.

The resin composition of the present invention, as mentioned above, comprises a polyarylenesulfide resin and a thermoplastic norbornene-type resin. Because the thermoplastic norbornene-type resin is non-crystalline, it does not exhibit such a sharp increase in the fluidity as the polyarylenesulfide resin does, when melted. It also exhibits only small anisotropy in the rate of contraction and the coefficient of linear expansion by molding. Thus, incorporation of a thermoplastic norbornene-type resin in the polyarylenesulfide resin not only eliminates the drawbacks of the latter, such as production of flashes and generation of anisotropy during molding, but also significantly improves the moldability of the resin, the productivity, and the dimensional precision. Furthermore, because the thermoplastic norbornene-type resin has a high glass transition temperature, it does not seriously impair the high heat resistance inherently possessed by polyarylenesulfide resins, even if it is blended with the polyarylenesulfide resins. However, molded articles made of a resin composition to which a large amount of a thermoplastic norbornene-type resin is incorporated may deform when used for a long period of time under high temperature conditions or when subjected to heat at a high temperature for soldering, thus conspicuously decreasing the product reliability. It is therefore necessary that the resin have a specific limited composition in order for the various drawbacks of polyarylenesulfide to be eliminated and for the resin composition to maintain heat resistance at a level sufficient for practical use. Specifically, the resin composition should contain 99–50% weight of the polyarylenesulfide component (A) and 1–50% weight of the thermoplastic norbornene-type resin component (B). It is particularly preferable that the composition contain 95–60% weight of the polyarylenesulfide component (A) and 5–40% weight of the thermoplastic norbornene-type resin component (B).

When the resin composition of the present invention is directed to an application in which the product is used at a high temperature or soldering is necessary to manufacture the products, it is particularly preferable that the resin composition have a Vicut softening point of 200° C. or higher and a heat deformation temperature of 80° C. or higher at a load of 66 psi. In order to achieve this Vicut softening point requirement and the heat deformation temperature requirement, the amount of the polyarylenesulfide component should be 55% by weight or greater.

If the amount of the polyarylenesulfide component exceeds 99% by weight, anisotropy by molding increases and adhesion to lead frames and other materials is decreased; if it is less than 50% by weight, the flame retardancy and the soldering heat resistance are impaired. Particularly, in the case where the thermoplastic norbornene-type resin contains no polar groups in the norbornene structure, the amount of the polyarylenesulfide component in the range of 1–45% by weight is preferred.

In order to increase the mutual solubility or compatibility of the polyarylenesulfide resin (A) and the norbornene-type resin (B) for further improving the moldability, impact strength, and the like in the resulting resin composition, it is desirable to add a compatiblizer, which is a polymer having a multi-phase structure consisting of (i) a copolymer which contains, as major components, an olefin unit and an unsaturated compound unit having at least one functional group selected from carboxyl group, acid anhydride group, oxazoline group, and epoxy group, and (ii) a vinyl-type (co)polymer containing at least one vinyl monomer, to the mixture of (A) and (B). The amount of the compatiblizer to be added is normally 1–20 parts by weight for 100 parts by weight of the total amount of the polyarylenesulfide resin (A) and the norbornene-type resin (B).

The copolymer which contains, as major components, an olefin unit and an unsaturated compound unit having at least one functional group selected from carboxyl group, acid anhydride group, oxazoline group, and epoxy group (hereinafter called Polymer I), used for producing the polymer having the multi-phase structure is, for example, a bi-, tri, or multi-dimensional copolymer made from an olefin, an unsaturated compound having the above-mentioned functional groups, and, optionally, other unsaturated compound. Ethylene or propylene, especially ethylene, are preferred olefins used for producing the Polymer I.

Given as examples of unsaturated compounds having carboxyl group are acrylic acid, methacrylic acid, and maleic acid; those having anhydride group are maleic anhydride and itaconic anhydride; those having oxazoline group are vinyl oxazoline and the like; and those having epoxy group are glycidylmethacrylate and allyl glycidyl ether. Preferable functional groups are epoxy group and acid anhydride group.

The amount of olefins in Polymer I is typically 60–99.5% by weight, with 0.5–40% by weight being unsaturated compound monomers having functional groups. Other unsaturated compounds may be contained in an amount of 0–39.5% by weight.

The vinyl-type (co)polymer containing at least one vinyl monomer in the multi-phase structure is a polymer having a number average polymerization degree of 5–10,000, preferably 10–10,000, and produced by the polymerization of one or more monomers selected from the group consisting of aromatic vinyl monomers, such as styrene, methylstyrene, dimethylstyrene, ethylstyrene, isopropylstyrene, chlorostyrene, α-methylstyrene, and α-ethylstyrene; esters, such as methyl-, ethyl-, propyl-, isopropyl-, butyl-, 2-ethylhexyl-, cyclohexyl-, dodecyl-, or octadecyl esters of (meth)acrylic acid; vinyl ethers, such as vinyl methyl ether and vinyl ethyl ether; vinylcyano compounds, such as acrylonitrile and methacrylonitrile; and vinyl compounds having no carboxyl group, acid anhydride group, oxazoline group, or epoxy group, such as acrylic acid amide compounds.

The multi-phase structure is defined as the structure consisting of a matrix of Polymer I (or vinyl (co)polymer) and pherical particles of vinyl (co)polymer (or Polymer I) homogeneously dispersed in the matrix polymer.

The particle size of the dispersed polymer is 0.001–10 μm, an preferably 0.01–5 μm. If this particle size of the dispersed polymer is smaller than 0.001 μm or larger than 10 μm, the resulting resin composition have a low mechanical strength.

In order to achieve the objects of the present invention, it is desirable that the multi-phase structure contain 5–95% by weight, and preferably 20–90% by weight, of Polymer I.

The method of manufacturing this multi-phase structure may be any commonly known methods such as the chain transfer method, the ionized radiation method, and the like. The most preferable method is the method described in Japanese Patent Laid-open (kokai) No. 48856/1989.

Other thermoplastic resins may optionally be incorporated in the thermoplastic resin composition of the present invention up to 50 parts by weight for 100 parts by weight of the amount of the thermoplastic resin composition of the present invention. Thermoplastic resins having a glass transition temperature of 25° C. or higher can be used as such other thermoplastic resins. Examples are styrene-type resins, vinyl chloride-type resins, acryl-type resins, polyphenylene ether resins, polycarbonate resins, polyester resins, polyamide resins, polyether-sulfone resins, polysulfone resins, polyimide resins, polyether imide resins, polyether ketone resins, polyether-ether ketone resins, polyallylate resins, polytetrafluoro-ethylene resins, and polydifluoroethylene resins.

A filler is usually added to the thermoplastic resin composition of the present invention as component (C). Preferable fillers are fibers having an aspect ratio (L/D) of 1 or more, beads having an aspect ratio (L/D) of 1, and powders. Here, the aspect ratio is defined as the ratio of the average length (L) to the average diameter (D).

In order to improve the stiffness properties, fiber fillers (C) preferably have an aspect ratio of 30 to 500. If the aspect ratio of the component (C) is smaller than 30, the thermoplastic resin composition does not have good stiffness properties, even if the anisotropy is reduced. If it is greater than 500, the anisotropy becomes too large for the resulting thermoplastic resin composition to be practically used, even though the stiffness properties are promoted.

In order to reduce the anisotropic properties, the L/D ratio of the fibrous filler (C) must be 20 or smaller, preferably 10 or smaller, and the average diameter should be in the range of 0.1 to 250 μm, preferably in the range of 0.1 to 200 μm. If the average diameter of the fibrous filler (C) is smaller than 0.1 μm, the thermoplastic resin composition has no improvement in the stiffness properties; if it is larger than 250 μm, the impact strength and appearance of the products are impaired.

The average diameter of powdery filler (C) is smaller than 100 μm, and preferably smaller than 60 μm. Molded articles having excellent appearance can be obtained by using the component (C) which satisfies these conditions.

Enumerated as examples of fibrous fillers are inorganic fibers, such as glass fibers, alumina fibers, potassium titanate fibers, silicon nitride fibers, zirconia fibers, silica fibers, silicon carbide fibers, ceramic fibers, asbestos fibers, gypsum fibers, and metal fibers; and carbon fibers. Given as examples of powdery fillers are silicates, such as wallastenite, sericite, kaolin, mica, clay, bentonite, asbestos, talc, and alumina silicate, metallic oxides, such as alumina, silicon oxide, magnesium oxide, zirconium oxide, and titanium oxide; carbonates, such as calcium carbonate, magnesium carbonate, and dolomite; sulfates, such as calcium sulfate and barium sulfate; glass beads; boron. nitride; and silicon carbide. These may be hollow particles.

Either one kind of filler may be used singly or two or more fillers may be used together.

If necessary, the fillers may be used after pretreatment with a silane coupling agent or the like. Silane coupling agents which can be used are, for example, vinylsilane, acrylsilane, aminosilane, epoxysilane, chlorosilane, mercaptosilane, and peroxysilane.

The amount of filler (C) is 20–200 parts by weight, preferably 20–150 parts by weight, for 100 parts by weight of the total amount of the polyarylenesulfide resin (A) and the norbornene-type resin (B). If this amount of fillers is less than 20 parts by weight, the heat resistance and stiffness properties of the resulting thermoplastic resin composition are low; if it exceeds 200 parts by weight, the moldability and impact strength are impaired.

A flame retarding agent (D) may be optionally incorporated in the thermoplastic resin composition of the present invention. Halogen-type, phosphorus-type, metal oxide-type, and inorganic-type flame retarding agents are given as the flame retarding agents which can be used in the present invention.

Included in the halogen-type flame retarding agents are bromine-type flame retarding agents, such as ammonium bromide, tetrabromobisphenol A, tetrabromophthalic acid anhydride, hexabromobenzene, hexabromocyclododecane, bis(bromoethyl ether)tetrabromobisphenol A, brominated polycarbonate, and brominated polystyrene; and organic chlorine-type flame retarding agents, such as chlorinated paraffin, chlorinated polyethylene, and tetrachlorophthalic anhydride. Combined use of these halogen-type flame retarding agents and $Sb_2O_3$ increases the flame retarding effects.

Given as examples of phosphorus-type flame retarding agents are halogen-free phosphates, such as triphenyl phosphate and cresyldiphenyl phosphate; halogen-containing phosphates, such as tris(chloropropyl)phosphate, tris(2,3-dibromopropyl)phosphate; and the like.

Antimony oxide, sodium antimonate, Flame-cut A-1, Fire DT, and aluminum hydroxide are given as examples of metal oxide-type and inorganic-type flame retarding agents.

These flame retarding agents may be used either singly or two or more of them may be used together.

The amount of the flame retarding agents (D) to be used in the thermoplastic resin composition of the present invention is 1-40 parts by weight, preferably 2-30 parts by weight, and more preferably 2-20 parts by weight, for 100 parts by weight of the total amount of the polyarylenesulfide resin (A) and the norbornene-type resin (B). If this amount of the flame retarding agents exceeds 40 parts by weight, the impact strength is impaired.

If necessary, suitable amounts of antioxidants, UV absorbers, and lubricants may be added to the thermoplastic resin composition of the present invention. The antioxidant which can be used in the present invention include 2,6-di-t-butyl-4-methylphenol, 2-(1-methylcyclohexyl)-4,6-dimethylphenol, 2,2-methylene-bis-(4-ethyl-6-t-butylphenol), and tris(dinonylphenylphosphite). Examples of the UV absorbers include p-t-butylphenylsalicylate, 2,2'-dihydroxy-4-methoxybenzophenone, 2-(2,2'-dihydroxy-4'-m-octoxyphenyl)benzotriazole, TINUVIN 320 (trademark, manufactured by Ciba Geigy), TINUVIN 329 (trademark, manufactured by Ciba Geigy), TINUVIN 622LD (trademark, manufactured by Ciba Geigy), and CHIMASSORB 119FL (trademark, manufactured by Ciba Geigy). Examples of the lubricants are paraffin wax, stearic acid, hydrogenated oils, stearoamide, methylene bisstearoamide, m-butylstearate, ketone wax, octyl alcohol, and hydroxystearic acid triglyceride.

Crystal nucleus agents may be added to the thermoplastic resin composition of the present invention. Either organic or inorganic crystal nucleus agents may be used.

Given as examples of inorganic crystal nucleus agents are elemental materials, such as Zn powder, Al powder, graphite powder, and carbon black; metallic oxides, such as ZnO, MgO, $Al_2O_3$, $TiO_2$, $MnO_2$, $SiO_2$, $Fe_3O_4$; nitrides such as boron nitride; inorganic salts, such as $Na_2CO_3$, $CaCO_3$, $MgCO_3$, $CaSO_4$, $CaSiO_3$, $BaSO_4$, and $Ca_3(PO_4)_3$; and clay minerals, such as talc, kaolin, clay, and terra abla.

Organic crystal nucleus agents which can be used include organic salts, such as calcium oxalate, sodium oxalate, calcium benzoate, calcium phthalate, calcium tartarate, and magnesium stearate; heat resistant polymers; and cross-linked heat resistant polymers.

Among these, especially preferred are boron nitride; clay minerals such as talc, kaolin, clay, and terra abla; and polymers with cross-linked or branched structures.

Some of these crystal nucleus agents overlap inorganic fillers and can perform the both functions. A sufficient amount used as the crystal nucleus agents is 0.002-5 parts by weight, preferably 0.02-2 parts by weight, for 100 parts by weight of the polyarylenesulfide resin (A). If this amount of the crystal nucleus agents is less than 0,002 parts by weight, the effect of increase in the rate of crystallization is insufficient.

Because the crystal nucleus agents can control the rate of crystallization of polyarylenesulfide resins, the crystallization of the resins can be designed so as to complete when the resin composition in charged in the injection mold, thereby reducing production of flashes.

Furthermore, because the crystal nucleus agents are low molecular weight compounds, they have an effect of plasticizing and can improve the fluidity and moldability of the resin composition of the present invention when it is in a melted state.

Phosphite-type antioxidants also exhibit this effect.

The thermoplastic resin composition of the present invention can be prepared by blending the resins, fillers, flame retarding agents, and other optional additives using a mixer, such as a monoaxial or multiaxial extruder, a Bumbury's mixer, a kneader, or a mixing roll.

In one example of the methods for preparing the thermoplastic resin composition of the present invention, the above components are blended by a mixer, melted and kneaded at 240°-360° C., and extruded using an extruder to obtain granules. In a more simple method, these components are directly melted and kneaded in a molding machine to obtain pellets. Alternatively, the resin components are kneaded using a biaxial extruder, following which fillers and flame retarding agents are added, and the mixture is made into pellets.

The thermoplastic resin composition of the present invention is molded into articles which can be directed to various applications.

As mentioned above, because of excellent heat resistance, tenacity, electrical insulation properties, chemicals resistance, and flame retarding properties, polyarylenesulfide resins have been molded into various articles of a variety of shapes. They have been widely used as a material for manufacturing electric or electronic parts, automobile parts, precision parts, and the like.

Nevertheless, because of the highly crystalline characteristics, the polyarylenesulfide resins exhibit too high fluidity above the melting point to be adequately controlled, resulting in production of flashes in the products during the molding operation. Removing flashes in the finishing step requires unduly excessive labor and costs, and also results in a significant reduction in the yield. Furthermore, the anisotropy in molding contraction and the coefficient of linear expansion gives rise to poor dimensional precision of the molded articles, so that their assembly is sometimes difficult. In order to obtain molded products with a designed dimension, it is essential to design molds and establish molding conditions taking the anisotropic properties of the polyarylenesulfide resin into consideration. This requires special techniques, involving costs which otherwise need not be expensed. There are also a problem that cracks may be produced when the molded products are removed form the molds.

Furthermore, due to the characteristics inherently possessed by the chemical structure of the polyarylenesulfide resins, the resins exhibit low adhesion properties to metals and various organic or inorganic materials. When the product is used for holding other articles, its holding power is poor. Further, it is difficult to print or to apply a paint to the molded article.

Because of these reasons, development of a resin composition which does not produce flashes as are experienced in polyarylenesulfide resins, exhibits improved anisotropy in molding contraction and the coefficient of linear expansion, as well as better adhesion properties, and is capable of providing highly reliable molded articles to be applied to uses in which stringent dimensional precision is required, has been desired. There has been no molded products satisfying these requirements.

The resin composition of the present invention exhibits reduced anisotropy in molding contraction, a suppressed increase in the fluidity when melted, and superb adhesion properties to various materials, all representing improvements in the defects in polyarylenesulfide resins due to their crystalline characteristics, while maintaining the excellent heat resistance inherently possessed by the polyarylenesulfide resins at a practical use level. The resin composition of the present invention thus provides highly reliable molded products suitably directed to applications demanding stringent dimensional accuracy at a high productivity.

There are no specific limitations as to the method for molding the thermoplastic resin composition of the present invention. Conventional known molding methods, such as injection molding, extrusion molding, pressure molding, and blow molding, can be used to produce articles with desired shapes. The use of a molding temperature in the range of 260°–380° C. is preferred for obtaining molded articles with good appearance, excellent dimensional stability, and high strength.

A pigment layer may be provided over the surface of the molded articles of the present invention. There are no specific limitations to the paints used for producing the pigment layer. A composition comprising a synthetic resin for paint, typically having a number average molecular weight of 1,000–1,000,000, and, as needed, pigments, dyes, metals, and metal compounds, dissolved or suspended in an organic solvent or water, can be used. Given as solvents which can be used here are methanol, acetone, methyl ethyl ketone, ethyl acetate, pentane, hexane, heptane, octane, and the like. Examples of the types of paints include melamine resin-type, vinyl chloride resin-type, epoxy resin-type, urethane resin-type, polyester resin-type, acryl resin-type, ABS resin-type, vinyl acetate resin-type emulsion, acryl resin-type emulsion, alkyd resin-type emulsion, polyamide resin-type, polyimide resin-type, polyvinylidene fluoride resin-type, silicone resin-type, and polybutadiene resin-type.

There are no specific limitations as to the method by which these paints are aoolied to the surface of the molded articles of the present invention. They may be applied by brushing, spraying, roll coating, dipping, or any other suitable coating means. In this instance, in order to produce a stiffer pigment layer, the surface of the molded articles may be treated with a solvent, an oxidizer, or the like in advance.

Further, for obtaining colored molded articles from the thermoplastic resin composition of the present invention, it is possible to add dyes or pigments to the resin composition before molding it.

Also, print may be applied to the articles molded from the thermoplastic resin composition of the present invention. Graphic printing, flexographic printing, silk screen printing, dry offset printing, transcription printing, stamping printing, and the like can be applied to printing the molded articles without any specific limitations.

Furthermore, an adhesive layer comprising an adhesive, a silane coupling agent, or the like may be provided to the molded articles of the present invention in order to increase the adhesion properties when the articles of the present invention is used combined with other molded articles. Any known adhesives, such as epoxy-type adhesive, acryl-type adhesive, cyanoacryl-type adhesive, polyurethane-type adhesive, silicone-type adhesive, UV-curable-type adhesive, and hotmelt-type adhesive, as well as a solution of thermoplastic norbornene-type resin dissolved in an organic solvent, can be used as the adhesive in the present invention. Among these, the solution of thermoplastic norbornene-type resin dissolved in an organic solvent is especially preferred, because this resin exhibits excellent compatibility with the thermoplastic norbornene-type resin in the resin composition of the present invention, thereby increasing the adhesion strength. The thermoplastic norbornene-type resins having either the same or different structure with the thermoplastic norbornene-type resin used in the resin composition of the present invention may be used as the adhesive, with those having the same structure being more preferable.

The adhesion of the molded articles of the present invention to the other molded article can be performed also by using the ultrasonic adhesion method.

The resin composition of the present invention is ideal for molding cases for CCD (charge coupled device). Conventionally, CCD has been used by affixing a CCD lid (or a CCCD cap) to a case, to which a tip has been attached, with an adhesive. Because a lead frame joined with a tip is attached by soldering to a CCD case, the CCD case must withstand reflow heat, must not induce corrosion in tips due to moisture invasion, and must have dimensional stability and surface smoothness. CCD cases therefore have been conventionally fabricated with ceramics.

Because ceramics are expensive, have poor processability, and possess a large specific gravity, trials have been undertaken to manufacture CCD cases from epoxy-type resins which are less expensive and light weight. Epoxy resins, however, take a longer time for molding because of the thermoset characteristics. Moreover, they have possibility of causing tip corrosion due to their high moisture absorptivity.

In addition, CCD lids, conventionally made of glass, required complex works for the surface processing and had a risk of being broken during CCD assembly. A CCD lid made of a thermoplastic resin has been therefore desired. The present inventors have previously proposed a CCD lid made of a norbornene-type thermoplastic resin (Japanese Patent Application No. 149831/1992).

A defect in a CCD lid made of a resin is that only a limited type of adhesive is usable for attaching the CCD lid to CCD cases which are made of ceramics. In addition, different coefficients of thermal expansion in materials the CCD case and the CCD lid render them to be more easily releasable, resulting in poor durability of the CCD.

The resin composition of the present invention, when used as a material for fabricating CCD cases, can greatly shorten the molding time because of its thermoplastic nature. Because it does not exhibit undue increase in the fluidity when melted and produces flashes only very limitedly, it can manufacture CCD case at high productivity. In addition, because the resin composition of the present invention has excellent adhesion properties to various materials, it can provide CCD cases with improved adhesion to lead frames and superior moisture resistance.

The molding temperature when CCD cases are manufactured from the resin composition of the present invention is 280°–360° C., preferably 300°–330° C. The thickness of the CCD cases is 0.3–10 mm, with a preferred thickness being 0.5–5 mm.

Upper and lower parts of such CCD cases are typically molded separately, and two parts are fabricated with a lead frame inserted therebetween using the above-mentioned adhesive or the ultrasonic adhesion method. The ultrasonic adhesion method is preferred in view of the better processability and minimal changes in the surface conditions.

The CCD cases thus manufactured can be used in combination with either the conventional CCD lids made of glass or CCD lids made of a thermoplastic norbornene resin. The CCD lids made of a thermoplastic norbornene resin are preferred to be combined with such CCD cases in view of better adhesion properties and smaller coefficient of expansion.

The above-mentioned adhesion methods can be applied to affixing the CCD cases and the CCD lids.

The thermoplastic resin composition of the present invention can be used for sealing electronic parts having lead wires or lead frames.

Sealing of electronic parts are performed for the purposes of providing electrical insulation, mechanical protection, and preventing characteristic changes due to surrounding conditions. Thermoplastic resins such as epoxy resins and silicone resins have been used for sealing of electronic parts. These thermoplastic resins has a drawback of poor productivity on account of a long period of time required for the curing. Studies are ongoing concerning the use of thermoplastic polyarylenesulfide resins as a sealing material for electronic parts, because of the excellent heat resistance, tenacity, electrical insulation properties, chemicals resistance, and flame retarding properties. Notwithstanding these advantages, because of the crystalline characteristics the polyarylenesulfide resins exhibit too high fluidity above the melting point to be adequately controlled, resulting in production of flashes in the products during the molding operation. These resins exhibit also anisotropy in molding contraction and the coefficient of linear expansion, giving rise to production of cracks when the molded products are removed from the molds during the sealing operation or when they are heated at a high temperature for soldering.

Furthermore, on account of their chemical structure and the crystalline characteristics, the polyarylenesulfide resins can exhibit only low adhesion properties to metallic lead wires and lead frames. During the use extending over a long period of time, moisture may invade from the interface of the polyarylenesulfide resin used as a sealing material and the lead wires or lead frames, causing the electric insulation properties to be reduced and the electrodes to be corroded. There have been studies for improving the adhesion between the polyarylenesulfide resins and lead wires or lead frames, such as a method of applying a specific adhesive to the lead wires or lead frames in advance before sealing them with polyarylenesulfide resins or a method of adding a specific additive to the resins. The method of applying an adhesive in advance makes the process steps complicated and lowers the productivity. Regarding the method of using additives, conventional additives which are resistive to heat only at a low temperature impair the high heat resistance which is an advantage of the polyarylenesulfide resins. Some additives are crystalline in nature. Using such additives together with the polyarylenesulfide resins which are also crystalline cannot improve the anisotropy. Such polyarylenesulfide resin compositions have therefore problems of heat deformation at a high temperature, causing electronic parts to be deformed during the soldering operation.

Because of these reasons, development of a resin composition comprising a polyarylenesulfide resins for sealing lead wires and lead frames with improved anisotropy in molding contraction and the coefficient of linear expansion, and exhibiting improved adhesion properties to lead wires and lead frames, without impairing superior heat resistance of the polyarylenesulfide resin, has been desired. In spite of this desire, there have been no resin compositions which satisfy all these requirements.

The all above-mentioned problems have been solved by the method of sealing electronic parts using the resin composition of the present invention. Because of incorporation of a norbornene-type resin which is non-crystalline in nature and which is free from the anisotropy and conspicuous increase in the fluidity when it is melted, it has become possible to do without designing the molds and the sealing conditions taking the anisotropy of the polyarylenesulfide resins into consideration, and further to simplify the process by eliminating the step for removing flashes after molding. This sealing method has thus greatly improved the productivity.

Furthermore, the combined use of a norbornene-type resin and a polyarylenesulfide resin in the present invention has improved adhesion properties to other materials, which are not possessed by the latter. The use of the resin composition of the present invention can therefore ensure improved adhesion of the sealing material to lead wires and lead frames, providing sealed electronic parts, in which no moisture invasion occurs. Thus, products with no deterioration in their performances and with higher reliability can be provided by the sealing method of the present invention.

There are no specific limitations as to the method for sealing electronic parts using the thermoplastic resin composition of the present invention, and the sealing is performed mainly by means of injection molding, transfer molding, pressure molding, or dipping. When the injection molding or the transfer molding is employed, a number of electronic parts are inserted in a mold, then lead frames, for example, are inserted and the mold is closed, following which the thermoplastic resin composition of the present invention is injected. After the completion of molding, the mold is opened and the molded parts are removed. In this instance, an adhesive or a coupling agent may be coated in advance on the lead wires or lead frames of the electronic parts. Commonly known and conventionally used adhesives or coupling agents, for example, epoxy-type adhesive, polyimide-type adhesive, silane coupling agent, or titanate coupling agent, can be used for this purpose.

As materials for the lead wires or lead frames of electronic parts, any optional materials such as iron, nickel, copper, aluminum, tin, zinc, cobalt, ziconium, or any combinations of these, can be used.

In the case where the electronic part is a photo-semiconductor, which is so called a composite photo-element, such as a photo-coupler or a photo-interrupter, which comprises a photo-receptor and a photo-emitter in a single element to internally transmit and receive signals, such a photo-semiconductor can be sealed using a non-transparent resin, after sealing the photo-receptor and photo-emitter with an optically transparent resin such as epoxy resin or silicone resin.

Conventionally, thermoset resins, such as epoxy resins, silicone resins, or phenol resins, have been used as the non-transparent resin. These heat curable resins, however, take a long time for being cured, giving rise to reduced productivity.

Because of this, studies have been undertaken recently for using polyarylenesulfide resins as the non-transparent resin instead of thermoset resins for sealing photo-semiconductors due to the excellent heat resistance, tenacity, electrical insulation properties, chemicals resistance, and flame retardancy, and further due to the thermoplastic properties which enable the molding time to be significantly shortened and ensure improvement in the productivity. However, because of the crystalline characteristics the polyarylenesulfide resins exhibit too high fluidity above the melting point to be adequately controlled, resulting in production of flashes in the products during the molding operation. These resins exhibit also anisotropy in molding contraction and the coefficient of linear expansion, giving rise to production of cracks when the photo-semiconductors are removed from the molds when they are removed from the molds after having been sealed with a polyarylenesulfide resin following the sealing with a transparent resin, or when they are heated at a high temperature for soldering. There are risks for the signals to be transferred with difficulty between photo-emitters and photo-receptors depending on the structure of the photo-semiconductor.

Furthermore, on account of their chemical structure and the crystalline characteristics, the polyarylenesulfide resins can exhibit only low adhesion properties to other resins or metals. Adhesion between the transparent resin and the polyarylenesulfide resin in a photo-semiconductor may not be sufficient. There are risks for openings to be produced between them, which may cause moisture to enter into the photo-semiconductor. Thus, the resin may not function as a sealing material.

In addition, such openings also may be produced between the transparent resin and the polyarylenesulfide resin due to anisotropy when the photo-semiconductor is heated when soldering. If high voltage is charged between the external connection lead wires in the photo-emitter side and the photo-receptor side, a discharge may occur in the openings at the interface of the transparent resin and the polyarylenesulfide resin, which may result in breakage of the photo-emitter or the photo-receptor or insulation breakage in the interface.

Further, because of poor adhesion of polyarylenesulfide resin used for sealing to lead wires and lead frames, water may invade from the interfaces, resulting in decrease in the electrical insulation and corrosion of electrodes.

As a method of improving transparent resins and non-transparent resins, Japanese Patent Application Laid-open (kokai) Nos. 94679/1989 and 22553/1991 disclose a method of sealing photo-emitter or the photo-receptor with a transparent resin, followed by a treatment of the surface of the transparent resin with ultraviolet lights or ozone, then sealing them with a non-transparent resin.

A problem of this method is impaired productivity due to the addition of the surface treatment step of the transparent resin. Further no improvement has been achieved in the adhesion between the lead wires and lead frames and the non-transparent resin in this method. This problem is particularly conspicuous when a low adhesive polyarylenesulfide resin is used as the non-transparent resin.

These problems relating to the polyarylenesulfide resins have been solved by the resin composition of the present invention in which a norbornen-type resin is incorporated. The resin composition has no anisotropy, produces no flashes during molding, and exhibits excellent adhesion to other materials. The use of this resin composition as the non-transparent resin makes it easy to determine the sealing conditions without regard to anisotropy of the resin, and eliminates a flash removing step after the sealing operation, which greatly increases the productivity. In addition, since the resin composition ensures improved adhesion to the transparent resin, lead frames, and lead wires, the sealing method using the resin composition of the present invention can provide photo-semiconductors which are free from deterioration and highly reliable.

There are no specific limitations as to the sealing method, so long as the photo-semiconductor can be sealed first with an optically transparent resin and then with the non-transparent resin of the present invention. Mainly, injection molding, transfer molding, pressure molding, or dipping can be employed.

The optically transparent materials for sealing photo-semiconductors may be any transparent resins. Epoxy resin, silicone resin, 4-methyl-1-pentene resin, and thermoplastic norbornene-type resin are preferably used. Among these, transparent thermoplastic norbornene-type resins are especially preferred, because such resins exhibit excellent compatibility with the thermoplastic norbornene-type resin in the resin composition of the present invention, thereby increasing the adhesion strength.

When a transparent thermoplastic norbornene-type resin is used for this purpose, those having either the same or different structure with the non-transparent thermoplastic norbornene-type resin may be used as the adhesive, with those having the same structure being more preferable.

The sealing can be carried out, for example, using a process comprising sealing the photo-semiconductor with a transparent resin, inserting the photo-semiconductor in the mold, closing the mold, injecting non-transparent resin composition of the present invention, and opening the mold after completion of the molding to remove the molded parts. In this instance, an adhesive or a coupling agent may be coated in advance on the lead wires or lead frames of the photo-semiconductor or on the transparent resin in order to increase properties. Commonly known and conventionally used adhesives or coupling agents can be used for this purpose. The same adhesives or coupling agents as mentioned in connection of sealing electronic parts can be preferably used here.

Painting or printing can be preferably applied to the surface of the sealed portions of the electronic parts sealed using the thermoplastic resin composition of the present invention. Here, the paints, painting methods, and printing methods which are previously mentioned in connection with the painting or printing of the articles molded from the thermoplastic resin composition of the present invention can be also applied.

The electronic parts used for sealing using the thermoplastic resin composition of the present invention include lead-through mounting parts and surface mounting parts.

Beside the above-mentioned photo-semiconductors, electronic parts to which the sealing by the use of the thermoplastic resin composition of the present invention can be applied include ICs, LSIs, VLSIs, hybrid ICs, transistors, diodes, triodes, condensers, resistors, resistor networks, thyristers, tip inductors, transformers, motors, LC filters, connectors, coil ballisters, transducers, crystal oscillators, fuses, current sensors, electric sources, switches, relays, sensors, hole elements, surge absorbers, arresters, and pin grid arrays, as well as composite parts of these.

Molded articles which can be made from the thermoplastic resin composition of the present invention include: electronic parts, beside the above-mentioned electronic parts for which the thermoplastic resin composition is used for sealing, tact switches, slide switches, microswitches, dipswitches, microrelays, IC sockets, burn-in sockets, trimmers, connectors, magnetic head cases, electrolytic condenser caps, photocable connectors, printed boards, LC filter cases, and cases for CCD (charge coupled device); household electric or electronic parts, such as FDD carriages, bearings, optical discs, optical pick-up bases, VTR cylinder bases, rotary connectors, motor brush holder-commutators, magnetic cooker coil bases, parts of electronic oven (stirrer shafts, trays, turn table rings), dryer nozzles, steam iron valves, cases for optical fiber convergent lenses; automobile parts, such as alternator parts (terminal blocks, sockets, brush holders), electromagnetic coil bobbin cases, fuse cases, fuel injector air flow meters, star terminals, halogen lamps, sockets, wiper motor bushes, carburetor head valves, two-wheel cooler joints, carburetor sheet lead valves, exhaust gas control valves, washer nozzles, lamp reflectors, cylinder head covers, underhood parts, clean fun, radiator tanks, relay caps, and window screens; and mechanical parts, such as watch base plates, copying machine parts (gears, roll cases, bearing holders), chemical pump case impellers, gear pumps, flow meters, and general engine carburetor heat insulators.

Other features of the invention will become apparent in the course of the following description of the exemplary embodiments which are given for illustration of the invention and are not intended to be limiting thereof.

EXAMPLES

In Examples hereinafter, "parts" and "%" designate "parts by weight" and "% by weight", respectively, unless otherwise specified.

Various properties in Examples were measured according to the following methods and standards.

Heat Resistance

Vicat softening point was measured using a test leaf with a thickness of ⅛" at a load of 1 kg and a temperature rise at a rate of 50° C. per hour according to JIS K7206.

Stiffness

Flexural modulus of elasticity was measured using a test leaf with a size of 3/2"×⅛"×5" according to JIS D790.

Impact Strength

Izod impact was measured using a test leaf with a size of ¼"×½"×5/2" (with a notch) according to JIS D790.

Moldability

Melt flow rate (MFR) was measured under conditions of 316° C.×5 kg according to JIS K7210.

Flame Retarding Properties

Measured according to UL 94 test (flame resistance test in the UL Standard).

Anisotropic Properties (Anisotropic Properties in Molding Contraction)

Test samples were molded using a rectangular mold having a size of 5" (length)×½" (width)×1/32" (thickness) under the following conditions.

<Molding conditions>
Injection mold: All rounder hydromonica: trademark, manufacture by ARBURG Co.
Cylinder temperature: 315° C.
Mold temperature: 150° C.
Holding time: 5 seconds
Cooling time: 8–22 seconds
Cushion: 3–5 mm
Cycle time: about 19 seconds
Injection pressure: varies depending on samples The standard of anisotropic properties is defined by the following formula:

$$\text{Standard of anisotropic properties} = \frac{\epsilon_v}{\epsilon_p} = \frac{(w_o - w)/w_o}{(l_o - l)/l_o}$$

wherein $\epsilon_p$ is a ratio of the molding contraction rate along the direction of resin flow and $\epsilon v$ is the molding contraction rate in the direction vertical to the resin flow, l and w are length and width, respectively, of the test sample at normal temperature, and $l_o$ and $w_o$ are length and width, respectively, of the mold at normal temperature. Because the direction of the length is the direction to which the resin composition flows and the direction of the width is vertical thereto, the value determined by the above formula can be a standard for representing the anisotropic properties in the molding contraction due to the flow during the injection molding.

Flash Area

A pressure required for the resin composition to be filled in the resin reservoir opposite to the gate was determined by the trial and error method under the same molding conditions as used in the measurement of the anisotropic properties. The area of flashes (the area of the portion of the resin which came outside the mold) produced under this pressure was measured.

Reflow Soldering Heat Resistance

Test plates with a size of 5"×½"×1/16" were subjected to preheating (at 180° C. for 120 seconds) and heating (at 260° C. for 30 seconds) using a reflow checker RC-8 (trademark, a product of Malcom Co.). The maximum temperature, appearance, and contraction along the flow direction of the test plates were evaluated.

Adhesion Strength

Test plates, 5"×½"×⅛", made of a norbornene-type resin and the thermoplastic resin composition of the present invention, were adhered to a plane surface such that each plate overlaps lengthwise for ½". A 10% solution of a norbornene-type resin in toluene was coated over the area where test plates were to be adhered. A weight was put on the test plates and the plates were allowed to stand for 24 hours at room temperature to dry the adhesive. The adhesive strength was measured by pulling the adhered test plates at a rate of 50 mm per minute.

Fitness

The power required for peeling by pulling a test leaf was measured according to JIS C6481, wherein a copper foil was placed in the bottom of a mold with a size of 150 mm×150 mm×5 mm, on which the resin composition sample was placed and press-molded at 300° C., followed by peeling according to JIS C6481.

Paint Coating Properties

The appearance of the painted surfaces were observed by the naked eyes and evaluated according to the following criteria.

AAA: Good
BBB: Fair
CCC: Poor

Adhesion Properties to Coated Films

One hundred (100) 1 mm×1 mm squares were produced on a coated plate with a cutter, and the cellophane tape peeling test was performed. The adhesion properties were evaluated according to the following criteria.

AAA: No square was peeled off
BBB: 1-10 squares were peeled off
CCC: 11 or more squares were peeled off Anisotropic Properties on Flexural Modulus of Elasticity Flexural modulus of elasticity was measured on two sheets of test sample, 50 mm×12 mm×2 mm, one cut from a molded plate of a size, 100 mm×50 mm×2 mm, along the direction of resin flow in the molding and the other cut from a molded plate with the same size vertically to the direction of the resin flow. The standard of the anisotropic properties was determined by the following formula:

$$\text{Standard of anisotropic properties} = \frac{FM_O(V)}{FM_O(P)}$$

wherein $FM_o(P)$ and $FM_o(V)$ are the flexural modulus of elasticity of the sample produced along the direction of resin flow and that produced vertically to the direction of resin flow, respectively.

The closer the value to 1, the smaller is the anisotropic properties.

Reference Example

<Preparation of Norbornene-type Thermoplastic Resin (B)>

(B)-1

100 g of 8-methyl-8-methoxycarbonyltetracyclo-[4.4.0.1$^{2,5}$.1$^{7,10}$]dodeca-3-ene, 60 g of 1,2-dimethoxyethane, 240 g of cyclohexane, 9 g of 1-hexene, and 3.4 ml of a diethylaluminum chloride solution in toluene (0.96 mol/l) were charged in an autoclave with an internal volume of 1 l. In another flask, 20 ml of a 0.05 mol/l tungsten hexachloride solution in 1,2-dimethoxyethane and 10 ml of a 0.1 mol/l p-aldehyde solution in 1,2-dimethoxyethane were mixed. 4.9 ml of this mixture was added to the mixture in the autoclave, the autoclave was sealed tight, and the mixture was heated at 80° C. for 2 hours while stirring. A solvent, a 2:8 (by weight) mixture of 1,2-dimethoxyethane and cyclohexane, was added to the resulting polymer solution so as to make a 1:10 mixture (by weight) of the polymer and the solvent. This mixture was stirred for 10 minutes after the addition of 20 g of triethanolamine.

After the addition of 500 g of methanol, the polymer solution was stirred for 30 minutes and allowed to stand. The upper layer produced was separated and removed. Methanol was again added to the lower layer, and the mixture was stirred and allowed to stand, followed by separation of the upper layer. This procedure was carried out twice. The lower layer obtained by this procedure was appropriately diluted with cyclohexane and 1,2-dimethoxyethane, thus obtaining a 10% polymer solution in cyclohexane and 1,2-dimethoxyethane.

After the addition of 20 g of palladium/silica magnesia (manufactured by Nikki Kagaku Co., Ltd., palladium content: 5%), this solution was hydrogenated in an autoclave at 165° C. for 4 hours under hydrogen pressure of 40 kg/cm$^2$. The hydrogenation catalyst was removed by filtration to obtain a hydrogenated polymer solution.

An antioxidant, pentaerythrityl-tetrakis[3-(3,5-di-t-butyl-4-hydroxyphenyl)propionate], was added to the hydrogenated polymer solution in an amount of 0.1% for the hydrogenated polymer, and the solvent was removed under reduced pressure at 380° C.

The melted polymer thus obtained was pelletized by an extruder under a nitrogen atmosphere to produce a thermoplastic resin (B)-1 having an inherent viscosity of 0.45 dl/g (30° C. in chloroform), a weight average molecular weight of $7.0\times10^4$, a hydrogenation rate of 99.5%, and a glass transition temperature of 168° C.

(B)-2

The metathesis ring-opening polymerization was carried out in the same manner as in (B)-1, except that the polymerization reaction time was 4 hours, followed by the hydrogenation and the preparation of pellets, thus obtaining a thermoplastic resin (B)-2 having an inherent viscosity of 0.68 dl/g (30° C. in chloroform), a hydrogenation rate of 99%, and a glass transition temperature of 166° C.

(B)-3

The metathesis ring-opening polymerization was carried out in the same manner as in (B)-1 using 6-ethylidene-2-tetracyclododecene, followed by the hydrogenation and the preparation of pellets, thus obtaining a thermoplastic resin (B)-3 having an inherent viscosity of 0.45 dl/g (30° C. in chloroform), a weight average molecular weight of $5.5\times10^4$, a hydrogenation rate of 99%, and a glass transition temperature of 140° C.

(B)-4

55 mol of ethylene and 45 mol of 2-methyl-1,4,5,8-dimethano-1,2,3,4,4,4a,5,8,8a-octahydronaphthalene were polymerized by the addition polymerization and pelletized to obtain a thermoplastic resin (B)-4 having an inherent viscosity of 0.64 dl/g (35° C. in decaline), a weight average molecular weight of $10.0\times10^4$, and a glass transition temperature of 140° C.

EXAMPLES 1-8 AND COMPARATIVE EXAMPLES 1-4

<Component (A)> (Polyarylenesulfide)

(A)-1: Polyphenylenesulfide M2088 (linear-type polyphenylenesulfide: trademark, manufactured by Toray Co., Ltd.)

(A)-2: Polyphenylenesulfide M2100 (crosslinked-type polyphenylenesulfide: trademark, manufactured by Toray Co., Ltd.)

<Component (B)> (Thermoplastic Resin)

(B)-1, (B)-2, (B)-3, (B)-4: Thermoplastic norbornene-type resins prepared in Reference Example.

Polystyrene

Toporex 600 (trademark: manufactured by Mitsui Toatsu Co., Ltd.)

<Component (C)> (Inorganic Fillers)

(C)-1: Glass fibers CS03MA486A (trademark: manufactured by Asahi Fiber Glass Co., Ltd.)

(C)-2: Silica powder, Crystallite 5X (average diameter: 7 μm, maximum diameter: 10 μm; trademark: manufactured by Tatsumori Co., Ltd.)

<Compatiblizer>

Modiper A4101 (trademark: manufactured by Nippon Oil and Fat Co., Ltd.)

Thermoplastic resin compositions were prepared using the above components according to the formulation shown in Table 1, changing the ratio of polyphenylenesulfide and thermoplastic norbornene-type resin. The resin compositions were made into pellets using a 40 m/m extruder at 310° C. and injection molded at 300° C. to obtain samples for the tests. The results of the tests were shown in Table 1.

TABLE 1

| <Component> | Unit | Test method | Examples | | | | | | | |
|---|---|---|---|---|---|---|---|---|---|---|
| | | | 1 | 2 | 3 | 4 | 5 | 6 | 7 | 8 |
| (A)-1 | % | | 70 | 55 | 90 | 70 | 70 | 70 | — | 70 |
| (A)-2 | % | | — | — | — | — | — | — | 70 | — |
| (B)-1 | % | | 30 | 45 | 10 | — | — | — | 30 | 30 |
| (B)-2 | % | | — | — | — | 30 | — | — | — | — |
| (B)-3 | % | | — | — | — | — | 30 | — | — | — |
| (B)-4 | % | | — | — | — | — | — | 30 | — | — |
| Polystyrene | % | | — | — | — | — | — | — | — | — |
| (C)-1 | part | | 50 | 50 | 50 | 50 | 50 | 50 | 50 | — |
| (C)-2 | part | | — | — | — | — | — | — | — | 50 |
| Compatiblizer | part | | 10 | 10 | 10 | 10 | 10 | 10 | 10 | 10 |
| <Properties> | | | | | | | | | | |
| Vicut softening point | (°C.) | JIS K7206 | 280 | 256 | 290 | 282 | 268 | 268 | 281 | 272 |
| Flexural modulus of elasticity ($\times 10^{-4}$) | kgt/cm$^2$ | ASTM D790 | 8.23 | 8.05 | 9.35 | 8.50 | 8.14 | 8.12 | 8.20 | 8.32 |
| Melt flow rate | g/10 min | JIS K7210 | 32 | 28 | 40 | 31 | 32 | 33 | 30 | 34 |
| Anisotropy in molding contraction | %/% | | 1.75 | 1.69 | 1.93 | 1.81 | 1.81 | 1.86 | 1.50 | 1.22 |
| Flash area | cm$^2$ | | 1.30 | 1.18 | 1.80 | 1.25 | 1.33 | 1.32 | 1.27 | 1.33 |
| (Reflow soldering test) | | | | | | | | | | |
| Surface temperature | °C. | | 218 | 217 | 219 | 218 | 216 | 216 | 220 | 217 |
| Contraction | % | | 0.15 | 0.18 | 0.14 | 0.18 | 0.18 | 0.19 | 0.15 | 0.18 |
| Appearance | | | AAA | AAA | AAA | AAA | AAA | AAA | AAA | AAA |
| Adhesion strength | kgt/cm$^2$ | | 44 | 48 | 12 | 43 | 38 | 37 | 44 | 44 |
| Fitness to copper plate | | JIS C6481 | AAA | AAA | AAA | AAA | AAA | AAA | AAA | AAA |
| Paint coating properties | | | AAA | AAA | AAA | AAA | AAA | AAA | AAA | AAA |
| Adhesion properties to coated films | | | AAA | AAA | BBB | AAA | BBB | BBB | AAA | AAA |
| Anisotropy in flexural modulus of elasticity | | | 0.64 | 0.68 | 0.60 | 0.65 | 0.62 | 0.61 | 0.62 | 0.63 |

| <Component> | Unit | Test method | Comparative Examples | | | | | |
|---|---|---|---|---|---|---|---|---|
| | | | 1 | 2 | 3 | 4 | 5 | 6 |
| (A)-1 | % | | 100 | 20 | 20 | 20 | 99.5 | 70 |
| (A)-2 | % | | — | — | — | — | — | — |
| (B)-1 | % | | — | 80 | — | — | 0.5 | — |
| (B)-2 | % | | — | — | — | — | — | — |
| (B)-3 | % | | — | — | 80 | — | — | — |
| (B)-4 | % | | — | — | — | 80 | — | — |
| Polystyrene | % | | — | — | — | — | — | 30 |
| (C)-1 | part | | 50 | 50 | 50 | 50 | 50 | 50 |
| (C)-2 | part | | — | — | — | — | — | — |
| Compatiblizer | part | | 10 | 10 | 10 | 10 | 10 | 10 |
| <Properties> | | | | | | | | |
| Vicut softening point | (°C.) | JIS K7206 | 296 | 182 | 178 | 177 | 295 | 197 |
| Flexural modulus of elasticity ($\times 10^{-4}$) | kgt/cm$^2$ | ASTM D790 | 9.38 | 6.2 | 5.7 | 5.5 | 9.37 | 7.52 |
| Melt flow rate | g/10 min | JIS K7210 | 55 | 18 | 22 | 22 | 53 | 45 |
| Anisotropy in molding contraction | %/% | | 2.93 | 0.74 | 0.91 | 0.91 | 2.71 | 2.2 |
| Flash area | cm$^2$ | | 2.18 | 1.08 | 1.10 | 1.11 | 2.12 | 2.05 |
| (Reflow soldering test) | | | | | | | | |
| Surface temperature | °C. | | 220 | 212 | 210 | 212 | 219 | 216 |
| Contraction | % | | 0.11 | 0.24 | 0.28 | 0.30 | 0.12 | 0.30 |
| Appearance | | | AAA | BBB | BBB | BBB | AAA | BBB |
| Adhesion strength | kgt/cm$^2$ | | 4 | 52 | 48 | 47 | 5 | 8 |
| Fitness to copper plate | | JIS C6481 | CCC | AAA | AAA | AAA | CCC | CCC |
| Paint coating properties | | | BBB | AAA | AAA | AAA | BBB | BBB |
| Adhesion properties | | | CCC | AAA | AAA | AAA | CCC | CCC |

TABLE 1-continued

| | | | | | | |
|---|---|---|---|---|---|---|
| to coated films | | | | | | |
| Anisotropy in flexural modulus of elasticity | 0.55 | 0.83 | 0.82 | 0.80 | 0.56 | 0.60 |

As can be seen from Table 1, the thermoplastic resin compositions of the present invention (Examples 1–8) were excellent in heat resistance and moldability, exhibited reduced anisotropic properties in molding contraction, and produced a smaller amount of flashes during molding. Their painting properties were also excellent.

The composition of Comparative Example 1, in which no thermoplastic norbornene-type resin was incorporated, produced a large amount of flashes, exhibited significant anisotropic properties in molding contraction. Its painting properties were poor.

On the other hand, the compositions of Comparative Examples 2–4, in which an excessive amount of the thermoplastic norbornene-type resin was incorporated, had Vicut softening points lower than 200° C. They exhibited heat deformation in the reflow soldering test, showing that their heat resistance in molded articles was inadequate.

The composition of Comparative Example 5, in which only a very small amount of thermoplastic norbornene-type resin was incorporated, exhibited only insufficient improvements in the reduction of flashes and anisotropic properties in molding contraction. Its painting properties were also poor.

The composition of Comparative Example 6, in which a polystyrene resin was incorporated instead of the thermoplastic norbornene-type resin, had a low Vicut softening points and exhibited inadequate performances in the reflow soldering heat resistance test. This resin composition also exhibited only insufficient improvements in the reduction of flashes and anisotropic properties in molding contraction, and inferior painting properties.

EXAMPLES 9–14

<Component (A)> (Polyarylenesulfide)

(A)-1: Polyphenylenesulfide M2088 (linear-type polyphenylenesulfide: trademark, manufactured by Toray Co., Ltd.)

(A)-2: Polyphenylenesulfide M2100 (crosslinked-type polyphenylenesulfide: trademark, manufactured by Toray Co., Ltd.)

<Component (B)> (Thermoplastic Resin)

(B)-1: Thermoplastic norbornene-type resin prepared in Reference Example.

<Component (C)> (Inorganic Fillers; Mica (Canadian mica, manufactured by Repco Co., Ltd.)

(C)-1 Average diameter 16 μm, aspect ratio 35
(C)-2 Average diameter 3 μm, aspect ratio 20
(C)-3 Average diameter 500 μm, aspect ratio 65

<Component (D)> (Flame Retarding Agent)

Ammonium polyphosphate EXOLIT 422 (trademark, manufactured by Hoext Japan Ltd.)

<Compatiblizer>

Modiper A4101 (trademark: manufactured by Nippon Oil and Fat Co., Ltd.)

<Rubbery Component>

SEBS Clayton G1651 (trademark: manufactured by Shell Chemical Co., Ltd.)

Thermoplastic resin compositions were prepared using the above components according to the formulations shown in Table 2, changing the blending ratio or types of polyphenylenesulfide, mica, the compatiblizer, and flame retarding agent. Test samples were prepared in the same manner by pelleting and injection molding as in Examples 1–8. The results of the tests are shown in Table 2.

TABLE 2

| <Component> | Unit | Test method | Examples | | | | | |
|---|---|---|---|---|---|---|---|---|
| | | | 9 | 10 | 11 | 12 | 13 | 14 |
| (A)-1 | % | | — | 60 | — | — | — | — |
| (A)-2 | % | | 60 | — | 90 | 60 | 60 | 60 |
| (B)-1 | % | | 40 | 40 | 10 | 40 | 40 | 40 |
| (C)-1 | part | | 75 | 75 | — | 75 | — | 75 |
| (C)-2 | part | | — | — | 75 | — | — | — |
| (C)-3 | part | | — | — | — | — | 75 | — |
| (D) Flame retarder | part | | — | — | — | — | — | 10 |
| Compatiblizer | part | | 5 | 5 | 3 | — | — | 5 |
| Rubber component | part | | 5 | 5 | 3 | — | — | 5 |
| <Properties> | | | | | | | | |
| Vicut softening point | (°C.) | JIS K7206 | 283 | 284 | 294 | 284 | 287 | 280 |
| Flexural modulus of elasticity ($\times 10^{-4}$) | kgt/cm$^2$ | ASTM 0790 | 8.10 | 8.15 | 9.42 | 8.01 | 7.00 | 6.32 |
| Anisotropy in molding contraction | %/% | | 1.7 | 1.1 | 1.8 | 1.7 | 1.8 | 1.7 |
| Izod impact strength | kgf·cm/cm | | 9 | 9 | 8 | 3 | 8 | 7 |
| Flame retarding properties (Reflow soldering test) | | UL94 | HB | HB | V-O | HB | HB | V-O |
| Surface temperature | °C. | | 222 | 219 | 226 | 221 | 222 | 221 |
| Contraction | % | | 0.12 | 0.12 | 0.11 | 0.15 | 0.16 | 0.15 |
| Appearance | | | AAA | AAA | AAA | AAA | AAA | AAA |

Table 2 shows that the addition of a compatiblizer can improve the Izod strength and the flexural modulus of elasticity of the polyarylenesulfide/norbornene resin composition. Furthermore, the addition of a flame retarding agent can improve the flame retarding properties without decreasing other properties such as heat resistance and moldability.

EXAMPLE 15

The thermoplastic resin composition of Example 1 was molded by injection molding at a mold temperature of 95° C. and a cylinder temperature of 310° C. to obtain an article for connector which had a good appearance. A connector was produced by inserting a contact made of gold-plated brass into this molded article. For the evaluation of adhesiveness of the contact, the connector was dipped in water dyed with a red ink at 25° C. for 24 hours and the invasion of water into the interface of the molded article and the contact was observed by the naked eyes. No invasion of water was found, demonstrating superior adhesion properties of the product.

EXAMPLE 16

An LSI was sealed using the resin composition of Example 8 by injection molding at a mold temperature of 95° C. and a cylinder temperature of 310° C. For the evaluation of adhesiveness between the resin and lead frame in the LSI in the same manner as in Example 15, the LSI was dipped in water dyed with a red ink at 25° C. for 24 hours and the invasion of water into the interface of the lead frame and the resin was observed by the naked eyes. No invasion of water was found, demonstrating superior adhesion properties of the product.

EXAMPLE 17

An photo-semiconductor, in which the receptor and emitter were sealed with optically non-transparent thermoplastic norbornene-type resin (A)-1, was sealed by injection molding using the thermoplastic resin composition of Example 8, as an optically transparent resin.

In the same manner as in Example 15, in order to evaluate adhesion properties between the non-transparent and transparent resins and between the non-transparent resin and the lead frame, this photo-semiconductor was dipped in water dyed with a red ink at 25° C. for 24 hours and the invasion of water into the interfaces of the non-transparent resin and transparent resin and of the non-transparent resin and the lead frame was observed by the naked eyes. No invasion of water was found, demonstrating superior adhesion properties of the product.

In order to evaluate the dielectric strength of the photo-semiconductors, voltages at 5.0 KV, 8.0 KV, and 10.0 KV were charged between the lead wires for external connection on the emitter side and the receptor side. The dielectric strength was found to be excellent, with the yield of accepted products being 100%.

EXAMPLE 18

A CCD case was molded using the resin composition of Example 1 by injection molding at a mold temperature of 95° C. and a cylinder temperature of 310° C. The CCD case obtained had a good appearance with no flashes. This CCD case was adhered to a CCD lid made of the norbornene-type resin (A)-1 prepared in Comparative Example by the ultrasonic method using 900M manufactured by Branson Co. under the conditions of 20 KHz frequency, 20 μm amplitude, 1 kg/cm² pressure, and a fusion time for 1 minute. After the adhesion, in the same manner as in Example 15, the product was dipped in water dyed with a red ink at 25° C. for 24 hours and the invasion of water was observed by the naked eyes. No invasion of water was found, demonstrating superior adhesion properties of the product.

COMPARATIVE EXAMPLE 7

Sealing of the photo-semiconductor was carried out in the same manner as in Example 16, except for using a resin composition comprising polystyrene resin instead of a thermoplastic norbornene resin of the present invention. Voltages were charged in the same manner as in Example 16 to evaluate the dielectric strength of the photo-semiconductors. The yield of accepted products was 72%, revealing that the dielectric strength of the products was unreliable.

Obviously, numerous modifications and variations of the present invention are possible in light of the above teachings. It is therefore to be understood that within the scope of the appended claims, the invention may be practiced otherwise than as specifically described herein.

What is claimed is:

1. A thermoplastic resin composition comprising (a) 50–99% by weight of a polyarylenesulfide resin and (b) 50–1% by weight of a polymer obtained by ring-opening polymerization of a norbornene structure containing monomer.

2. The thermoplastic resin composition according to claim 1, wherein said thermoplastic resin composition has a Vicat softening point of 200° C or higher.

3. The thermoplastic resin composition according to claim 1, wherein the norbornene structure containing monomer is at least one compound represented by the formula (V)

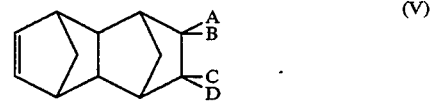

(V)

wherein A, B, C, and D individually represents a hydrogen atom, a hydrocarbon group having 1–10 carbon atoms, a halogen atom, a hydrocarbon group having 1–10 carbon atoms which are substituted by a halogen atom, groups of the formulas $—(CH_2)_nCOOR^1$, $—(CH_2)_nOCOR^1$, $—(CH_2)_nOR^1$, $—(CH_2)_nCN$, $—(CH_2)_nCONR^3R^2$, $—(CH_2)_nCOOZ$, $—(CH_2)_nOCOZ$, $—(CH_2)_nCOZ$, or $—(CH_2)_nW$, or B and C may together form a cyclic alkylene group of the formula,

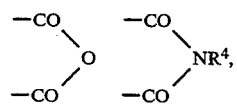

wherein $R^1$, $R^2$, $R^3$, and $R^4$ individually represent a hydrocarbon group having 1–20 carbon atoms, Z is a hydrocarbon group substituted by a halogen atom, W is a group $SiR^5_pF_{3-p}$ wherein $R^5$ is a hydrocarbon group having 1–10 carbon atoms and F denotes a halogen atom, $—OCOR^6$ or $—OR^6$ wherein $R^6$ is a hydrocarbon group having 1–10 carbon atoms, p is an integer of 0–3, and n is an integer of 1–10.

4. The thermoplastic resin composition according to claim 1 or 3, wherein the polymer obtained by ring opening polymerization of a norbornene structure containing monomer is hydrogenated.

5. The thermoplastic composition according to claim 1, wherein the proportion of the polyarylenesulfide is 95–60% by weight and the polymer obtained by ring opening polymerization of a norbornene containing monomer or its hydrogenated polymer is 5–40% by weight.

6. The thermoplastic composition according to claim 1, wherein the composition comprises a filler selected from the group containing fibers having an aspect ratio (L/D) of 1 or more, beads having an aspect ratio (L/D) of 1, and powders.

7. The thermoplastic composition according to claim 1, wherein the composition comprises a compatibilizer.

8. The thermoplastic composition according to claim 1 or claim 3, wherein the norbornene containing monomer is 8-methyl-8-methoxycarbonyltetracyclo-[4.4.0.1$^{2.5}$.1$^{7.10}$]-dodeca-3-ene.

* * * * *